July 1, 1952 M. DE GROOTE ET AL 2,602,077
CERTAIN POLYOL ETHERS
Filed Dec. 22, 1949 4 Sheets—Sheet 1

FIG. 1.

Melvin De Groote
Bernhard Keiser
INVENTORS,

July 1, 1952 M. DE GROOTE ET AL 2,602,077
CERTAIN POLYOL ETHERS
Filed Dec. 22, 1949 4 Sheets-Sheet 3

Patented July 1, 1952

2,602,077

UNITED STATES PATENT OFFICE 2,602,077

CERTAIN POLYOL ETHERS

Melvin De Groote, University City, and Bernhard Keiser, Webster Groves, Mo., assignors to Petrolite Corporation, Ltd., Wilmington, Del., a corporation of Delaware Application December 22, 1949, Serial No. 134,582

6 Claims. (Cl. 260—53)

The present invention is concerned with certain new chemical products, compounds, or compositions which have useful application in various arts. It includes methods or procedures for manufacturing said new chemical products, compounds, or compositions, as well as the products, compounds or compositions themselves.

We have discovered that if one treats a suitable phenol-acetylenic hydrocarbon resin as hereinafter described with a combination of glycide, propylene oxide, and ethylene oxide within the proportions hereinafter specified, the mixed phenol-acetylenic hydrocarbon glycol ether so obtained is unusually effective as a demulsifying agent for water-in-oil emulsions, and also has utility in various other arts hereinafter described. One specific example exemplifying the herein contemplated compounds is the product obtained by reacting 12.5 pounds of an amylphenol acetylene resin with 2.5 pounds of glycide, and 8.4 pounds of propylene oxide, followed by reaction with 6.5 pounds of ethylene oxide. Such oxyalkylations are usually conducted in presence of an alkaline catalyst, and actually produce a cogeneric mixture. The specific compound, or better still, cogeneric mixture just mentioned, is only one of a series of similar compounds or mixtures having, in the main, the same general structure or composition.

Previous reference has been made to the fact that the herein specified products are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

This specific application or use of our reagents is described and claimed in our co-pending application, Serial No. 134,581, filed December 22, 1949, now Patent 2,594,542, granted April 29, 1952.

The compounds or cogeneric mixtures herein described are not only useful for breaking oil field emulsions but also are useful for various other purposes, such as a break inducer in the doctor treatment of sour hydrocarbons, as an emulsifying agent, as a component in the preparation of micellar solutions, as an additive to non-hydrocarbon lubricants, as an intermediate for further reaction by virtue of the terminal hydroxyl radical, etc.

In subsequent paragraphs from time to time reference is made to "compounds or cogeneric mixtures." At first glance it may appear that such language is indefinite and, perhaps, contradictory. It is the intention at the moment only to point out that there is no inconsistency in such description, and that, subsequently, there will be a complete explanation of why such designation is entirely proper.

As has been pointed out previously the present invention is concerned with certain reaction products or cogeneric mixtures obtained from four reactants or components combined in specific proportions as hereinafter described in detail. There is no difficulty in setting forth in graphic form a somewhat similar mixture obtained from three components instead of four, i. e., from a suitable phenol-aldehyde resin, and ethylene oxide and propylene oxide as distinguished from a quaternary mixture employing the same three reactants and also glycide in addition.

Our co-pending applications, Serial Nos. 129,709 and 129,710, filed November 28, 1949 of which the former is now Patent 2,574,543, granted November 13, 1951, describe tertiary mixtures using the conventional triangular graph. The transition from a triangular graph to what would normally be a space model (a regular tetrahedron) followed by subsequent modification so as to transform a three-dimensional model within certain limitations to a two-dimensional plane, presents a certain amount of detailed text.

The present invention is concerned with a cogeneric mixture which is the end product of a reaction or reactions involving 4 reactants. Assuming completeness of reaction and based on a mathematical average, the final product is characterized most conveniently in terms of the 4 component reactants. This phase of the invention is described elsewhere in greater detail.

In representing a mixture or an end product derived from 2 components or 3 components, there is no difficulty as far as using the plane surface of an ordinary printed sheet. For example, a 3-component system is usually represented by a triangle in which the apexes represent 100% of each component and any mixture or reaction product in terms of the 3 components is represented by a point in the triangular area in which the composition is indicated by perpendiculars from such point to the sides. Such representation is employed, for example, in our co-pending applications, Serial Nos. 129,709, and 129,710, filed November 28, 1949.

Chemists and physicists ordinarily characterize a 4-component system by using a solid, i. e., a regular tetrahedron. In this particular presentation each point or apex represents 100% of each of the 4 components, each of the 6 edges represents a line or binary mixture of the 2 components represented by the apexes or points at the end of the line or edge. Each of the 4 triangles or faces represent a tertiary mixture of the 3 components represented by the 3 corners or apexes and obviously signify the complete absence of the 4th component indicated by the corner or apex opposite the triangular face.

However, as soon as one moves to a point within the regular tetrahedron one has definitely characterized and specified a 4-component mixture in which the 4 components add up to 100%.

Figure 1:
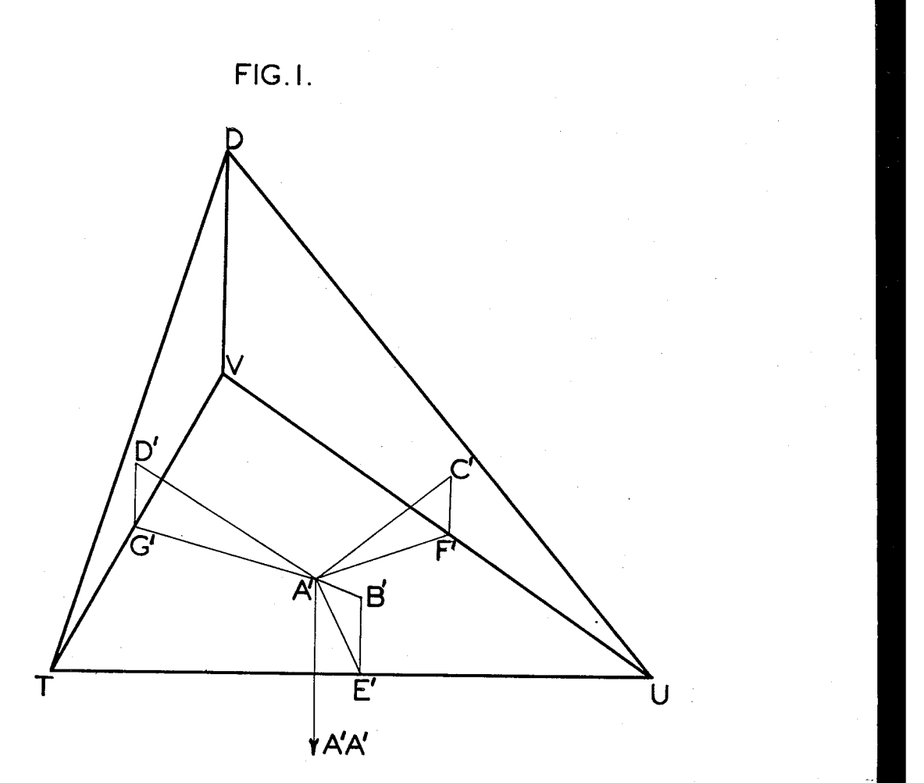

In accompanying Figure 1 an attempt is made to illustrate this system of representation visibly in a plane surface. For sake of convenience one need only consider a regular tetrahedron resting on one face or triangular surface. If somewhere towards the middle of such tetrahedron one places a plane parallel to the base of the tetrahedron one again obtains an equilateral triangle which, of course, is reduced in size compared with the equilateral triangle which is the bottom of the regular tetrahedron. In Figure 1 the tetrahedron may be considered as formed by some transparent material and for convenience the new tetrahedron formed by the passage of the horizontal plane is, of course, a regular tetrahedron also. For convenience, one can consider that he is looking directly at this tetrahedron which is shown somewhat distorted for purpose of convenience, and in the smaller regular tetrahedron the apexes are T, U, V and D. The lines are TU, VU, TV and VD. The four equilateral triangles are TVD, UVD, TUV and TUD. Bearing in mind that this tetrahedron is just the upper part of what is assumed as being part of a larger tetrahedron and not showing, it is assumed for purpose of illustration that a point has been selected within this larger tetrahedron to indicate a specific mixture composed of 4 components. For convenience, the point is taken as A'. If from A' perpendiculars are erected to each of the four planes then there are designated at least three of them by lines which are shown and indicated as follows: A'B', A'C', A'D'. The fourth perpendicular goes from A' to the point in the plane beneath which is the assumed base of the original larger regular tetrahedron. Since the larger tetrahedron is not shown for the reason that it would only add confusion, this perpendicular is indicated simply by the line A'—A'A'.

Figure 2:
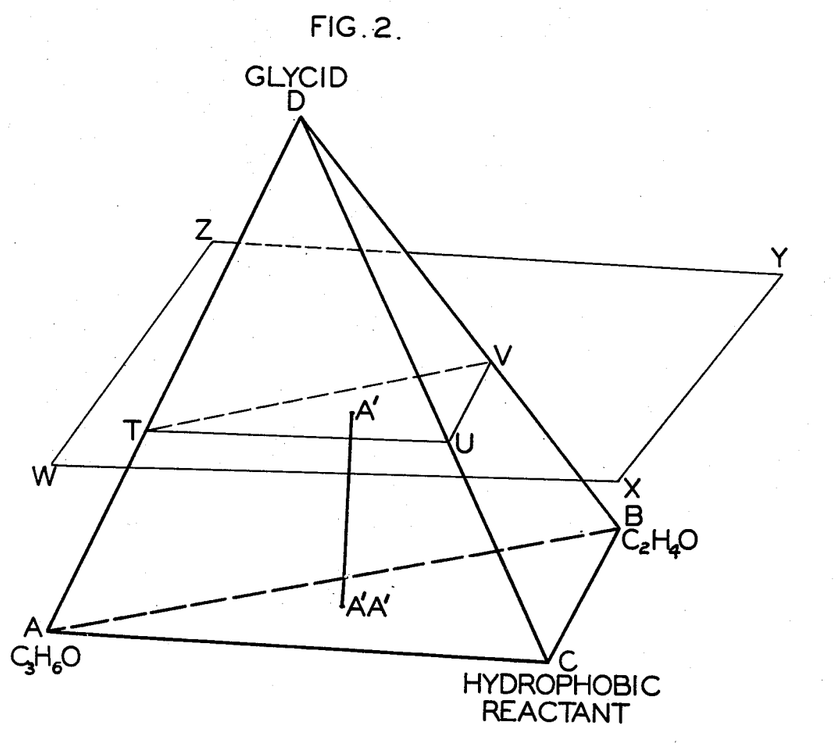

What has been said previously is illustrated in a slightly different aspect actually showing both the large tetrahedron and the plane in Figure 2. In this instance again the regular tetrahedron must be presented in a somewhat distorted aspect in order to show what is desired. The present invention is concerned with a cogeneric mixture derived from 4 components, to wit, ethylene oxide, propylene oxide, glycide, and hydrophobic reactant which is susceptible to reaction with the 3 enumerated alkylene oxides. These 4 components or initial reactants represent the 4 points or apexes of the regular tetrahedron and it will be noted that in this presentation the 4 apexes are marked A, B, C, and D. A represents 100% of propylene oxide, B represents 100% of ethylene oxide, D represents 100% of glycide and C represents 100% of hydrophobic reactant.

Referring momentarily to what has been said in regard to Figure 1 it will be noted that a perpendicular which is comparable is shown as a line connecting point A with point A'A'. More important, however, is this fact, that when a plane is placed parallel to the base such plane of necessity has the same configuration as the base. If one selected some particular figure in the base, for instance a triangle, a square, a rectangle, a pentagon, or the like, and drew lines from the corners or apexes of such plane figure in the base, to the top apex D, then that same figure but in a reduced size would appear in the intersecting plane TUV shown in this particular figure. TUV is the equilateral triangle furnished by the intersecting plane WXYZ which intersects the regular tetrahedron parallel to the base.

Figure 3:
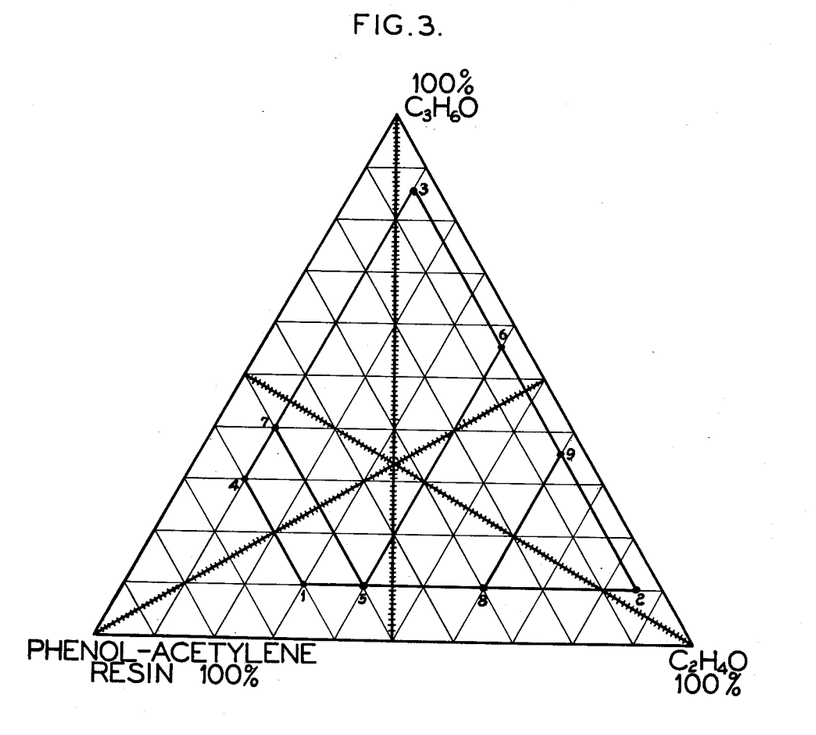
Figure 4:
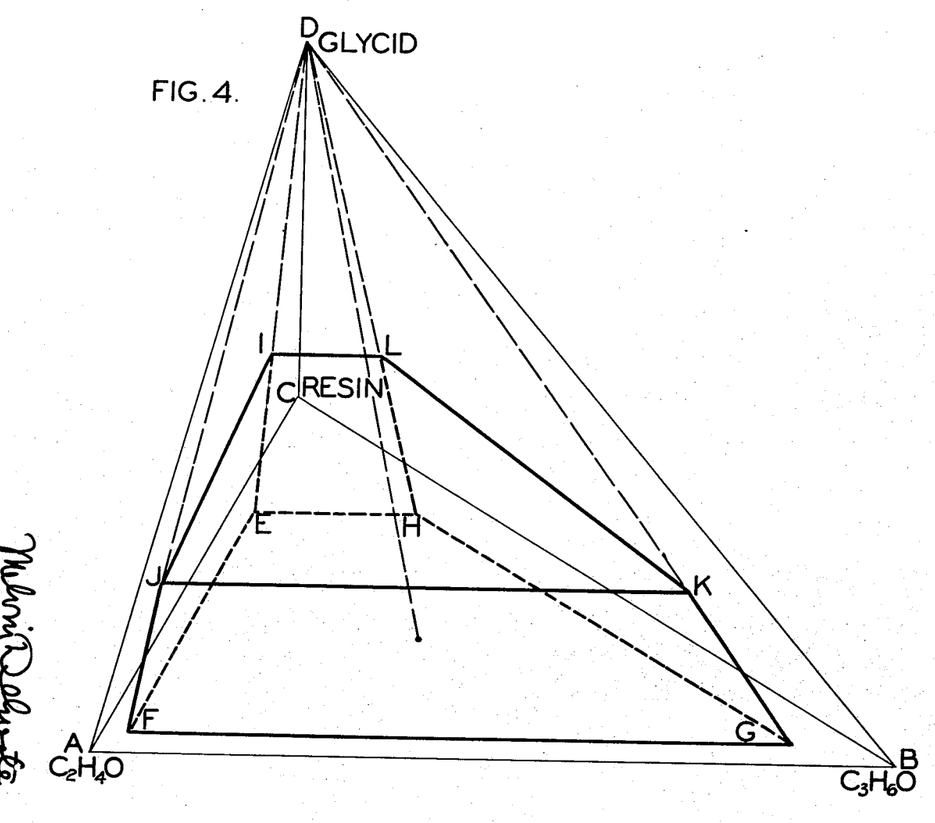

It is convenient to ignore temporarily Figure 3 and pass to Figure 4. Figure 4 again depicts the regular tetrahedron but actually is somewhat distorted, of course. It also shows a space or block within the tetrahedron and since the block is assumed to be somewhat above the base, each and every point in this block represents a 4-component system. The present invention is concerned with those compositions which are characterized and specified by this particular block. As stated previously if 3-dimensional models could be employed all that would be necessary would be to prepare the tetrahedron from sheets of plastic so that 100 sheets, for example, would represent the distance between the base and the apex, cut out the space represented by the block, and fill it in with colored wax or another plastic, and thus the representation would be complete. This is not possible due to limitations which have been pointed out previously.

The composition represented by the block which is really a truncated trapezoidal pyramid is designated by E, F, G, H, I, J, K, and L. Bear in mind that, as has been stated, the base of the truncated pyramid, that is, E, F, G, and H, does not rest on the bottom of the equilateral base triangle. As has been pointed out previously, point D represents 100% glycide. The base triangle represents the three other components and obviously 0% glycide. For purpose of what is said herein, the lower base of the truncated pyramid, E, F, G, H, is a base parallel to the equilateral triangle but two units up, i. e., representing 2% of glycide. Similarly, the upper base of the truncated pyramid, I, J, K, L lies in a plane which is 25 units up from the base, to wit, represents 25% glycide. Specifically, then, this invention is concerned with the use of components in which the glycide component varies from 2% to 25% glycide. The problem then presented is the determination of the other three components, to wit, ethylene oxide, propylene oxide, and the hydrophobic reactant.

A simplification of the problem of characterizing a 4-component system which enters into the spirit of the present invention is this: If the amount of one component is determined or if a range is set, for example, 2% to 25% of glycide, then the difference between this amount and 100%, i. e., 75% to 98%, represents the amounts of percentages of the other three components combined, and these three components recalculated to 100% bases can be determined by use of an ordinary triangular graph, such as employed in our previously mentioned co-pending applications, Serial Nos. 129,709, and 129,710, filed November 28, 1949.

This becomes even simpler by reference to Figure 1 in which it will be assumed that the amount of glycide is within the range of 2% to 25%, and since the base of the tetrahedron is an equilateral triangle the plane parallel to the base and through any point on the perpendicular which represents 2% to 25%, must also be an equilateral triangle.

In Figure 1 from the point A' there are the three conventional perpendiculars to the sides as employed in a 4-component system, i. e., A'B', A'C', A'D'; however, by definition the lines A'B', A'C', and A'D' must be perpendicular to the faces. This means that the angles G'D'A', A'C'F', and A'B'E', are right angles. Similarly, the angles D'G'A, A'E'B', and A'F'C' represent the angles between the faces of a regular tetrahedron and thus are constant. Since two angles of the triangle are the same, the third angle must be the same and it means that these three triangles are similar. This means that the ratio between the perpendiculars to the sides, that is, A'B', A'C', and A'D' bear the same ratio to each other as the perpendiculars to the edges bear to each other to wit, A'E', A'F', and A'G'. Therefore, when the fourth component, for example, glycide, has been set within the range 2% to 25%, the remaining three components consisting of 75% to 98% recalculated back to 100% bases, can be calculated or represented by the same triangular graph as is conventional and as employed in the above-mentioned co-pending applications, Serial Nos. 129,709, and 129,710, filed November 28, 1949.

Actually, as far as the limiting points in the truncated pyramid are concerned, which has been previously referred to in Figure 4, it will be noted that in the subsequent text there is a complete table giving the composition of these points for each successive range of glycide. In other words, a perfectly satisfactory repetition is available by means of these tables from a practical standpoint without necessarily resorting to the data of Figure 3.

Figure 3 shows a triangle and the three components other than glycide. These three components added together are less than 100%, to wit, 75% to 90%, but for reasons explained are calculated back to 100%. This point is clarified subsequently by examination of the tables. It will be noted also that in Figure 3 there is shown not only a trapezoid but in essence a trapezoid with a number of additional lines forming other trapezoids or triangles as indicated. The largest trapezoid is 1, 2, 3, 4. Within this tetrahedral area that are compounds whose compositions are indicated approximately by the parallelogram 3, 7, 5, 6. Likewise, another class are indicated by the fact that their compositions fall within the tetrahedral area defined approximately by points 5, 8, 9, 6. See substantially the same presentation as it appears in our co-pending applications, Serial Nos. 129,709, and 129,710, filed November 28, 1949.

Previous reference has been made to our co-pending applications, Serial Nos. 129,709 and, 129,710 filed November 28, 1949. As stated, these were concerned with products or cogeneric mixtures obtained from three components—an oxyalkylation, susceptible hydrophobic reactant, ethylene oxide and propylene oxide. The present invention contains the fourth component, glycide. At first glance it may seem rather odd that the introduction of glycide in even relatively small amounts radically affects the nature of the resultant products.

Comparing ethylene oxide, propylene oxide, and glycide, it is to be noted that in ethylene oxide the ratio of carbon atoms to oxygen is 2 to 1, in propylene oxide 3 to 1, and in glycide 1.5 to 1. This carbon-oxygen ratio, of course, explains the greater solubilizing effect of glycide in comparison with either ethylene oxide or propylene oxide but the principal difference is that in using glycide one can obtain a variety of branched chain or forked structures.

Assume that the hydrophobic oxyalkylation-susceptible reactant has one or more terminal groups which may be indicated thus:

R simply represents a divalent radical. Reaction with ethylene oxide, propylene oxide and glycide may be shown thus:

If one employs ethylene oxide first and then glycide, or propylene oxide first and then glycide, one obtains an increased hydrophile effect at the terminal groups for the reason there are two hydroxyls present instead of one, which additionally are susceptible to more complex micellar formation by virtue of association involving two hydroxyls. This is illustrated in the following manner:

It becomes obvious that glycide can be employed in a number of ways, three of which are as follows: (a) immediately and preceding the introduction of either ethylene oxide or propylene oxide; (b) after ethylene oxide has been introduced and before propylene oxide has been introduced, or vice versa; after propylene oxide has been introduced and before ethylene oxide has been introduced; and finally (c) glycide can be introduced in a terminal position after both ethylene oxide and propylene oxide have been introduced. Needless to say, glycide could be introduced in all three of these positions, or in two of the three. For that matter some ethylene oxide can be introduced, then glycide, and more ethylene oxide, or some propylene oxide, then glycide and more propylene oxide.

Suggestive of such variations are the following formulas:

For sake of simplicity it appears advisable to present mixtures obtained from three components first (the oxyalkylation-susceptible hydrophobic reactant, ethylene oxide and propylene oxide) and then carry the three-component system into the four-component system by after-treatment with glycide within the stipulated proportions. After such description it becomes obvious that other modifications of the kind previously suggested readily present themselves and need only minor description.

A variety of resins obtained from phenol and acetylene or its polymers, or from phenols, aldehydes having 1 to 8 carbon atoms and acetylene or its polymers, useful as intermediates for producing the products of the present invention are known. We refer to our Patent 2,560,333, granted July 10, 1951, for a detailed description of such resins, and to Examples 1 through 24 thereof for specific examples of phenol-acetylene resins, to Examples 1a through 68a for examples of suitable phenol-$C_1$-$C_8$ aldehyde resins for after treatment with acetylene to produce intermediates for use in producing the products of the invention and to Examples 1b through 10b for examples of phenol-aldehyde resins subjected to after treatment with acetylene to produce suitable intermediates, and to Examples 1c through 5c for examples of suitable intermediates prepared by the after treatment of phenol-acetylene resins with aldehydes.

Particularly important intermediates are those illustrated in the first half of column 9 of said patent, namely, those derived from acetylene and difunctional phenols having a hydrocarbon substituent containing at least 4 and not more than 12 carbon atoms.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyalkylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressure to obtain effective results, for instance, pressures up to 300 pounds along with correspondingly high temperatures, if required.

However, even in the instance of high-melting resins, a solvent such as xylene can be eliminated in either one of two ways: after the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules. Phenol-aldehyde resins of the type herein specified possess reactive hydroxyl groups and are oxyalkylation susceptible.

One procedure which can be employed in the use of a new resin to prepare products for use in the process of the invention is to determine the hydroxyl value by the Verley-Bölsing method or its equivalent so that the molecular equivalent of the resin may be calculated. The resin as such or in the form of a solution as described, was then treated with a mixture of ethylene oxide and propylene oxide in presence of 0.5% to 2% of sodium methylate as a catalyst in step-wise fashion. The ratios of propylene oxide and ethylene oxide employed correspond to the ratios in the limiting points on the triangular graph, to wit, points 1, 2, 3 and 4 of Figure 3. Our preference is to use the propylene oxide and then the ethylene oxide. In some instances such tests are best conducted by adding ethylene oxide first and then propylene oxide, or adding a mixture of the two alkylene oxides at the same time.

Attention is directed to the fact that in the subsequent examples reference is made to the stepwise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide, or mixture, slowly in a continuous stream and in such amount as to avoid exceeding the higher pressures noted in the various examples or elsewhere.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these products in a surface active or sub-surface-active range without testing them for demulsification. A few simple laboratory tests which can be conducted in a routine manner will usually give all the information that is required.

Ordinarily, the oxyalkylation is carried out in autoclaves provided with agitators or stirring devices. We have found that the speed of the agitation markedly influences the time reaction. In some cases the change from slow speed agitation, for example, in a laboratory autoclave with a stirrer operating at a speed of 60 to 200 R. P. M., to high speed agitation with the stirrer operating at 250 to 350 R. P. M., reduces the time required for oxyalkylation by one-half to two-thirds. Frequently xylene-soluble products which give insoluble products by procedures employing comparatively slow speed agitation, give suitable hydrophile products when produced by similar procedure but with high speed agitation, as a result, we believe, of the reduction in the time required with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, that is, an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

In preparing final products or compounds of the kind herein described, particularly adapted for demulsification of water-in-oil emulsions, and for that matter for other purposes, one should make a complete exploration of the wide variation in hydrophobe-hydrophile balance. This hydrophobe-hydrophile balance of the oxyalkylated resins is imparted, as far as the range of variation goes, to a greater or lesser extent to the herein described derivatives. This means that one employing the present invention should take the choice of the most suitable derivative selected from a number of representative compounds, thus, not only should a variety of resins be prepared exhibiting a variety of oxyalkylations, not only from the standpoint of a varying ethylene oxide-propylene oxide ratio, but also from a standpoint of adding one oxide first and then the other, and also from the standpoint of adding both oxides simultaneously. This can be done conveniently in light of what has been said previously.

From a practical standpoint, using pilot plant equipment, for instance, an autoclave having a capacity of approximately 3 to 5 gallons, we have made a single run by appropriate selections in which the molal ratio of resin equivalent to ethylene oxide is one to one, 1 to 5, 1 to 10, 1 to 15 and 1 to 20, or the same ratios using propylene oxide, followed by addition of the other oxides through a somewhat similar range, i. e., 1 to 20 moles of propylene oxide after the initial addition of ethylene oxide, or 1 to 20 moles of ethylene oxide after the initial addition of propylene oxide. In any event, however, such ratios are conducted to keep the ultimate derivative within the trapezoidal area on the triangular graph defined approximately by points 1, 2, 3 and 4 of Figure 3. Furthermore, in making these particular runs we have used continuous addition of ethylene oxide, or propylene oxide.

In the continuous addition of ethylene oxide we have employed either a cylinder of ethylene oxide without added nitrogen provided that the pressure of the ethylene oxide was sufficiently great to pass into the autoclave, or we have used an arrangement which, in essence, was the equivalent of an ethylene oxide cylinder with a means for injecting nitrogen so as to force the ethylene oxide in the manner of an ordinary selzer bottle, combined with the means for either weighing the cylinder or measuring the ethylene oxide used volumetrically. In the case of propylene oxide we invariably used nitrogen pressure to cause the oxide to move into the autoclave.

Such procedure and arrangement for injecting liquids is, of course, conventional. In adding ethylene oxide or propylene oxide continuously there is one precaution which must be taken at all times. The addition of the oxide must stop immediately if there is any indication that reaction is stopped or, obviously, if reaction is not started at the beginning of the reaction period. Since the addition of ethylene oxide is invariably an exothermic reaction, whether or not reaction has taken place can be judged in the usual manner by observing (a) temperature rise or drop, if any, (b) amount of cooling water or other means required to dissipate heat of reaction; thus, if there is a temperature drop without the use of cooling water or equivalent, or if there is no rise in temperature without using cooling water control, careful investigation should be made.

The resins employed are prepared in the manner described in various previous examples, Nos. 1a through 5c, inclusive. Instead of being prepared on a laboratory scale they were prepared in 10 to 15-gallon electro-vapor heated synthetic resin pilot plant reactors, as manufactured by the Blaw-Knox Company, Pittsburgh, Pennsylvania, and completely described in their Bulletin No. 2087, issued in 1947, with specific reference to Specification No. 71-3965.

In preparing the derivatives we have used the following procedure throughout. Prepare the resins with a certain amount of solvent, such as xylene, present purely as a convenience. We have treated the resins with propylene oxide and ethylene oxide in three different ways. (a) Add the ethylene oxide first and then the propylene oxide; (b) add the propylene oxide first and then the ethylene oxide; and (c) use a mixture of propylene oxide and ethylene oxide, and make a single addition. In each case we have used an alkaline catalyst equivalent to approximately 1.2% to 1% of the total reaction mass in the final stage, or equivalent to 1/4% of alkaline catalyst based on final compound. In some cases, as is obvious, such materials would be made stepwise for the reason that it is more convenient to produce a batch of oxyethylated resin, split it into three parts for instance and treat it with three different ratios of propylene oxide; or inversely, prepare an oxypropylated resin and split it into three batches and treat it with various amounts of ethylene oxide. Briefly stated, the initial exploration was based on the combined derivatives previously mentioned in the earlier part of this text. Further exploration was based on preparing the following compounds in the three diffrent ways mentioned. For convenience, at this stage the ratios are shown in molar ratio rather than weight, although as will be pointed out subsequently, it is more convenient to operate and set the limits on a weight basis.

Reference to molal basis means the phenolic nucleus plus a single adjoining bridge, i. e., the structural unit; or, stated another way, the radical attached to each phenolic hydroxyl. This reference to a molal ratio is distinguished from the obvious text where reference is made to the molecular weight of the resin molecule as a whole, i. e., a molecule consisting of several structural units.

In each case the solvent was present and the amount of solvent in the final product is shown in each case. The solvent was xylene and in some cases was removed by vacuum distillation for examination of the final product.

| Resin | Propylene Oxide | Ethylene Oxide | Solvent Per Cent |
|---|---|---|---|
| 1 | 2 | 2 | 50.0 |
| 1 | 2 | 4 | 50.0 |
| 1 | 2 | 7 | 50.0 |
| 1 | 2 | 10 | 50.0 |
| 1 | 3.5 | 2.5 | 50.0 |
| 1 | 3.5 | 4.7 | 50.0 |
| 1 | 3.5 | 7 | 50.0 |
| 1 | 3.5 | 10 | 50.0 |
| 1 | 3.5 | 15 | 50.0 |
| 1 | 5 | 3 | 50.0 |
| 1 | 5 | 6 | 50.0 |
| 1 | 5 | 9 | 50.0 |
| 1 | 5 | 12 | 50.0 |
| 1 | 5 | 15 | 50.0 |
| 1 | 8 | 3 | 50.0 |
| 1 | 8 | 6 | 50.0 |
| 1 | 8 | 9 | 50.0 |
| 1 | 8 | 12 | 50.0 |
| 1 | 8 | 15 | 50.0 |
| 1 | 14 | 3 | 50.0 |
| 1 | 14 | 6 | 50.0 |
| 1 | 14 | 9 | 50.0 |
| 1 | 14 | 12 | 50.0 |
| 1 | 14 | 15 | 50.0 |
| 1 | 14 | 18 | 50.0 |
| 1 | 14 | 21 | 50.0 |

In each case a number of resins were employed. In fact, the bulk of the investigation was based on seven resins obtained by the action of acetylene on the following seven phenols:

1. Para-secondary butylphenol
2. Para-tertiary amylphenol
3. Para-phenylphenol
4. Para-octylphenol
5. Mixed para- and orthopropylphenol
6. Cardanol
7. Side-chain hydrogenated cardanol This series so obtained in comparatively small sample lots were tested extensively and the data examined by plotting the composition on a percentage basis on a conventional triangular chart or graph as shown in the figure attached. In this chart each vertex represented 100% of the material indicated, i. e., a phenol-acetylene resin, ethylene oxide or propylene oxide. Likewise, the three lines connecting the vertices represent binary mixtures of the two particular constituents. Points in the area represent composition indicated in the usual manner.

The determining points in the large tetrahedron 1, 2, 3 and 4, of Figure 3 are indicated in the following data, both on a weight basis and a molal ratio basis. Obviously the weight basis is more satisfactory because as different resins are employed the formulations for change in molecular weight of the resin unit are eliminated, to say nothing of the ease of producing the desired compounds by merely following predetermined weight ratios indicated by the graph.

| Points | Resin | Ethylene Oxide | Propylene Oxide | Molal Ratio |
|---|---|---|---|---|
| | Per Cent | Per Cent | Per Cent | |
| 1 | 60 | 30 | 10 | 1 M: 1.95 M: .595 M. |
| 2 | 4 | 86 | 10 | 1 M: 86 M: 7.58 M. |
| 3 | 4 | 10 | 86 | 1 M: 10 M: 65.2 M. |
| 4 | 60 | 10 | 30 | 1 M: .665 M: 1.51. |

A series of 9 oxyalkylated derivatives were made from the first five resins in the list above, i. e., para-secondary butylphenol, para-tertiary amylphenol, para-phenylphenol, para-octylphenol, and mixed para- and octylpropylphenol. This particular series again was made in comparatively small amounts. In preparing these compounds we used a very small laboratory autoclave which handled approximately 15 to 50 grams of material and solvent as a starting point. In each instance the amount of solvent was added so that the final product, after the completion of the oxyalkylation step, represented fifty per cent solvent. The solvent employed was xylene.

The following table shows the exact amount of materials employed, i. e., weight of resin employed, weight of ethylene oxide employed, weight of propylene oxide employed, total amount of solvent present in the reaction mass, and also the amount of flake caustic soda employed as a catalyst.

| Ex. No. | Point on Chart | Resin Grams | Ethylene Oxide, Grams | Propylene Oxide, Grams | Wt. of Xylene, Grams | Flake Caustic Soda, Grams |
|---|---|---|---|---|---|---|
| A | 1 | 60 | 30 | 10 | 100 | .5 |
| B | 5 | 50 | 40 | 10 | 100 | .5 |
| C | 8 | 30 | 60 | 10 | 100 | .5 |
| D | 2 | 10 | 215 | 25 | 250 | 1.0 |
| E | 9 | 10 | 150 | 90 | 250 | 1.0 |
| F | 6 | 10 | 100 | 140 | 250 | 1.0 |
| G | 3 | 10 | 25 | 215 | 250 | 1.0 |
| H | 7 | 50 | 10 | 40 | 100 | .5 |
| I | 4 | 60 | 10 | 30 | 100 | .5 |

As stated this series was made on a small laboratory scale from five different phenol-acetylene resins, i. e., butylphenol, amylphenol, phenylphenol, octylphenol and propylphenol. In each case 45 derivatives were made in three different ways: (a) adding all the ethylene oxide first and then propylene oxide; (b) adding all propylene oxide first and then ethylene oxide; (c) mixing the two oxides and adding them simultaneously.

We have prepared also a number of similar derivatives in which the previously mentioned seven resins prepared from a selected phenol and acetylene were given an after-treatment with an aldehyde so as to produce a more complex resin in which there was present more than one type of linking unit, i. e., one derived from acetylene and one derived from an aldehyde. The same applies to some resins which were prepared in a reverse manner in which the phenol-aldehyde resin was subjected to after-treatment with acetylene.

In our two co-pending applications, Serial Nos. 129,707, and 129,708, both filed November 28, 1949, of which the former is now Patent 2,557,087, we pointed out that resins derived exclusively from phenols as specified therein, and formaldehyde, react the same way in the ethylene oxide-propylene oxide treatment, as do resins derived exclusively from comparable phenols and acetylene. It follows obviously that such resins in which the mixed groupings appear, i. e., both acetylene groupings and aldehyde groupings, must fall within the same limiting characteristics and for this reason and for purpose of brevity the rest of the description will be concerned largely with the phenol-acetylene resins, although the mixed type resin acts substantially the same and is susceptible to the same treatment as far as oxyalkylation goes, with the same results.

We again desire to point out that the amount of alkaline catalyst used is not critical. This is true whether the catalyst be caustic soda, caustic potash, sodium methylate, or any other suitable catalyst. The amount which we regularly employed has varied from 1%, based on the resin alone, to 1% based on the resin and oxides, although in many cases the reaction has been speeded up by using approximately twice this amount of caustic. We are inclined to believe that whenever the amount of caustic represents more than 2% of the reactants present, ignoring inert solvent, that there may be some tendency to form cyclic polymers with the alkylene oxide although this is purely a matter of speculation. For this reason, whether justified or not, we have usually avoided use of excess amounts of catalyst.

Referring now to the earlier reference as to the most suitable combinations, it will be noted, as previously stated, that they fall not only within the trapezoidal area defined by points 1, 2, 3 and 4 of Figure 3, but more specifically within the parallelogram which represents part of the trapezoidal area. This parallelogram is defined approximately by points 5, 6, 3 and 7 of Figure 3. We have prepared a large number of derivatives which come within this preferred area, i. e., within the area of the parallelogram. It is understood, of course, in each instance the composition is based on the assumption the percentage by weight basis is on a statistical basis which it obviously must be, and assume completeness of reaction. This applies, of course, not only to these examples but also to all previous examples. In preparing these examples we have used a xylene solution obtained by dissolving the resin. The final product in all instances was adjusted to 50% xylene and 50% resin. This was purely a matter of convenience. In this particular series and, in fact, any other series where large amounts of a phenol resin were employed, we have used commercially available para-tertiary butylphenol acetylene resin. The amounts of other resins available were limited to small quantities and thus part of the experiments were conducted on a laboratory scale.

The resins employed in the first series of compounds which are identified as Examples XAA1 through and including XFF1, were obtained from amylphenol acetylene resins, and which, for all practical purposes, are nothing more than the amylphenol homologues of the commercially available butyl acetylene resin. The amount of resin employed, the amount of ethylene oxide employed, and the amount of propylene oxide employed, are given in grams in the following six examples. The weight of caustic soda employed is indicated in grams. In all these examples all propylene oxide was added first and then all ethylene oxide.

| Ex. No. | Resin, Grams | Ethylene Oxide, Grams | Propylene Oxide, Grams | Flake, Caustic, Grams |
|---|---|---|---|---|
| XAA1 | 62.4 | 32.5 | 42.0 | .75 |
| XBB1 | 45.7 | 35.0 | 75.0 | .75 |
| XCC1 | 34.5 | 25.0 | 90.5 | .75 |
| XDD1 | 31.4 | 25.0 | 144.8 | 1.0 |
| XEE1 | 26.5 | 41.0 | 122.5 | 1.0 |
| XFF | 28.4 | 43.2 | 75.0 | .75 |

A second set of six examples designated as Examples XAA2 through XFF2, were prepared in the same manner, using the same ratios except that the resin employed was that made from para-secondary butylphenol. This resin was again substantially the analogue of commercially available butylphenol acetylene resin except that the commercial product was obtained from a para-tertiary butylphenol, and this resin was obtained from a para-secondary butylphenol. All the subsequent resins were the same analogues of commercial butylphenol acetylene resins except that the other phenols were employed as previously noted and as herein specified.

For example, in the third series of six compounds the same ratios were used and identified as Examples XAA3 through XFF3. The resin employed was prepared from acetylene and para-phenylphenol.

A fourth series of six examples was prepared, using the same ratios and identified as Examples XAA4 through XFF4, and prepared from para-octylphenol.

Similarly, a fifth series was prepared from the resin obtained by reaction between mixed para- and orthophenol and acetylene, designated as XAA5 through XFF5.

Likewise, a sixth series was prepared from the only presently commercially available phenol acetylene resin—the resin obtained from para-tertiary butylphenol and acetylene. This last series was indicated as XAA6 through XFF6.

In all these series the same ratios of reactants as indicated in Examples XAA1 through XFF1 were used. The procedure was the same as has been described previously in regard to oxyethylation and oxypropylation. In each instance the proylene oxide was added first and then the ethylene oxide.

In a second series of thirty compounds the same ratios were preserved in every respect, except that ethylene oxide was added first and then propylene oxide. These series are indicated by the designations YAA1, YBB1, YCC1, YDD1, YEE1, and YFF1, for the amylphenols, and the corresponding designation for the others.

A third series was prepared using the same ratios except that ethylene oxide and propylene oxide were mixed together and added simultaneously so that oxyalkylation was a random or indifferent oxyalkylation, in the sense that no control was employed to determine which oxide combined first with the resin. This third series is indicated by the prefix "Z" instead of X and Y.

When a hydroxylated material is subjected to oxyalkylation, particularly in such instances where a plurality of moles of the alkylene oxide are used per hydroxyl, one does not obtain a compound but a mixture which, on a statistical basis corresponds to the predetermined ratios. This applies not only to a polyhydroxylated compound such as a resin molecule, but also to a monohydric alcohol. A discussion of this aspect appears in co-ending application of Melvin De Groote et al., Serial No. 109,791, filed August 11, 1949, now Patent 2,549,494 and also Serial No. 109,792, filed August 11, 1949 and now abandoned.

As has been pointed out previously, one way of preparing compounds or cogeneric mixtures to be used in the present invention is to prepare a series of compounds such as those indicated by Examples A through I, preceding, or more specifically the series identified as XAA1 through XFF1, or the series YAA1 through YFF1, or the series ZAA1 through ZFF1.

Having prepared such series all that needs be done thereafter is to treat such oxyalkylated derivatives with glycide so that the percentage of glycide based on the total four-component reaction mass represents 2% to 25% by weight. Such procedure, however, has the obvious limitation that the glycide radical or radicals can appear in the terminal position only.

Referring now to Figure 4 it is obvious that the three components (ignoring glycide) are represented by either the lower trapezoidal based in Figure 4, i. e., E, F, G, H or I, J, K, L and then recalculated to 100% basis as a tertiary mixture; such three components must lie within the trapezoid 1, 2, 3, 4 in Figure 3, and the preferred proportions are within the parallel 3, 7, 5, 6.

Stated another way, if one selects the proportion of three components or reactants (ignoring glycide), and at any stage employs sufficient glycide so that on the basis of the quaternary mixture such glycide represents 2% to 25% of the total by weight, then and in that event one has automatically obtained a composition that is within the limits of the truncated trapezoidal pyramid identified as E, F, G, H—I, J, K, L in Figure 4. This represents the cogeneric mixture or reaction product in terms of initial reactants with the proviso that the glycide content is 2% to 25% by weight, and that the remaining three components recalculated to 100% basis (leaving out glycide for the moment) come within the trapezoidal area indicated by 1, 2, 3, 4 on the triangular graph, to wit, Figure 3.

We have prepared derivatives of the kind herein described in a scale varying from a few hundred grams or less, in the laboratory to hundreds of pounds on a plant scale. In preparing a large number of examples we have found it particularly advantageous to use laboratory equipment which permits continuous oxypropylation and oxyethylation. More specific reference will be made to treatment with glycide, subsequently in the text. The oxyethylation step is, of course, the same as the oxypropylation step insofar that two low boiling liquids are handled in each instance.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities are difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described above. If such arrangement is used to prepare laboratory scale duplications, then care should be taken that the heating mantle can be removed rapidly so as to allow for cooling; or better still, through an added opening at the top of the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this part; but in any event, when the initial amount of glycide is added to a suitable reactant, such as a resin, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

*Example 1d*

It is to be noted that the procedure followed can be conducted on any convenient scale, that is, on either a small laboratory scale, semi-pilot plant scale, pilot plant scale, or large plant scale. We have conducted experiments employing equipment of all such various sizes. Our preference even on a laboratory scale is to use continuous introduction of ethylene and propylene oxide, although this is not necessary. The introduction may be batchwise. Previous reference has been made to the catalyst used in connection with ethylene oxide and propylene oxide. These same alkaline catalysts, particularly caustic soda, caustic potash, sodium methylate, etc., are equally satisfactory with glycide which in many ways seems to be at least as reactive as ethylene oxide and possibly more reactive than propylene oxide.

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M.

The particular piece of equipment employed was adapted for the use of glycide without pressure, as well as the use of ethylene oxide and propylene oxide with pressure. Stated another way, instead of serving as an autoclave only it was also equipped with a water-cooled condenser which could be shut off when used as an autoclave. It was equipped also with an equivalent of a separatory funnel and an equalizing pressure tube so that a liquid such as glycide could be fed continuously at a dropwise or faster rate into the vessel and the rate controlled by visual examination. For convenience, this piece of equipment will be referred to as an autoclave.

12.5 pounds of amylphenol-acetylene resin were dissolved in 12.5 pounds of xylene so as to produce a solution representing 50% of resin by weight. This was charged into the autoclave. There were added approximately 10 ounces (approximately 5% by weight) of ground caustic soda. After being charged the autoclave was sealed, swept with nitrogen, stirring started immediately and heat applied. The temperature was allowed to rise to approximately 118° C.

The glycide employed was comparatively pure. 2.5 pounds of glycide were used. This was charged into the upper reservoir vessel which has been previously flushed out with nitrogen and was the equivalent of a separatory funnel. The glycide was started slowly into the reaction mass in a stream. Reaction started to take place immediately and the temperature rose approximately 11° to 14°. Cooling water was run through the coils so the temperature for addition of glycide was controlled within the range roughly of 112° to 132° C. The addition was continuous within limitations and all the glycide was added in less than 55 minutes. This reaction took place at atmospheric pressure with simply a small stream of nitrogen passing into the autoclave at the very top and passing out the open condenser so as to avoid any possible entrance of air. When the reaction was complete this condenser was shut off and also the opening to the glycide inlet and to the equalizing line. The equipment was used as an autoclave during the addition of propylene oxide and ethylene oxide. In other words, the equipment was operated under pressure. At this point the addition of propylene oxide was started. It was added continuously at such speed that it was absorbed by the reaction as rapidly as possible. The amount of propylene oxide added was 8.4 pounds. The time required to add this propylene oxide was less than one hour. During this time the temperature was maintained at 153° to 162.5° C., using cooling water through the inner coils when necessary, and otherwise applying heat if required. At the end of the addition of propylene oxide there was added ethylene oxide as previously indicated. The amount of ethylene oxide added was 6.5 pounds. The temperature employed, and operating conditions, were the same as with the addition of propylene oxide. It is to be noted, however, that ethylene oxide appears to be more reactive and the reaction seems to require a greater amount of cooling water to hold the temperature range indicated. The time required to add the ethylene oxide was less than an hour.

During the addition of the propylene and ethylene oxides, the pressure was held at approximately 55 pounds per square inch gauge pressure, or less. When all the oxides had been added (ethylene oxide being the final addition in this particular instance) the autoclave was permitted to stay at the same temperature range for another half hour, even longer if required, or until the gauge pressure had been reduced to zero or substantially zero, indicating the reaction was complete. The final product when freed from xylene by vacuum distillation was an oily material, somewhat viscous in nature, resembling castor oil. It was somewhat dispersible in water and also soluble in non-aqueous solvents, such as aromatic hydrocarbons, and others, although not soluble in some non-polar hydrocarbon solvents. The final yield was substantially the total weight of the initial reactants.

*Example 2d*

The same procedure was followed as in Example 1d, preceding, except that the order of addition of the oxides was reversed, the ethylene oxide being added first and the propylene oxide last. The time period, temperature range, pressure, etc., were kept the same as in Example 1d, preceding.

*Example 3d*

The same ratios were used, and the same procedure was followed as in Example 1d, but with the following difference; the equipment was used first as an autoclave to add the propylene oxide. All the propylene oxide was added, the condenser was open to atmospheric pressure, a slow stream of nitrogen was passed through the equipment to prevent air from coming in contact with the reaction mass, and then the same amount of glycide was added as in Example 1d, as the second alkylene oxide reactant instead of the first. When all the glycide had been added in approximately a 2-hour period of time, the connections were changed so that the ethylene oxide was added. The amounts employed, operating conditions, etc., were the same as in Example 1d.

*Example 4d*

The same procedure was followed as in Example 3d, preceding except that the stages of addition of ethylene oxide and propylene oxide were reversed, that is, the ethylene oxide was added as the first stage, using the equipment as an autoclave, then the glycide was added, and then the propylene oxide. The amounts used, operating conditions, etc., were identically the same as in Example 1d, preceding, except for the order of addition.

*Example 5d*

The cogeneric mixture obtained from Example XAA1, preceding, was treated with 1.3 pounds of glycide in the manner described in Example 1d, preceding. It is to be noted that in essence this is simply another variation of Example 1d, in which the equipment is used as an autoclave, first to add the propylene oxide and then to add the ethylene oxide, and then the glycide when using the equipment with a condenser open to the atmosphere with a slow stream of nitrogen passing through to prevent entrance of air.

*Example 6d*

The product obtained from Example XBB1, preceding, was treated with 1.1 pounds of glycide in the manner described in Example 1b, preceding. It is to be noted that this example again is simply a variation of Example 1d, in which the ethylene oxide was added first and then the propylene oxide. During these two additions the equipment was used as an autoclave and then the customary change made and glycide added to the extent of 1.1 pounds in the manner described in Example 1d, preceding.

*Example 7d*

The same procedure was followed as in Example 1d with the following change. After the glycide was added the propylene oxide and ethylene oxide were added as a mixture (14.9 pounds). This mixture of ethylene oxide and propylene oxide was obtained from 8.4 pounds of propylene oxide and 6.5 pounds of ethylene oxide. In this instance, again, the time range, temperature, and pressure were kept substantially the same as in Example 1d, preceding.

*Example 8d*

The product obtained from Example XCC1 described above, was treated .9 pound of glycide in the manner previously described under the heading of Example 1d. The procedure employed was that described in Example 5d, preceding.

Example 9d

The examples previously described as Examples 1d, through 8d, inclusive, were repeated making the following change. The amount of catalyst added, instead of being 10 ounces was increased to 11.5 ounces. The amount of glycide used was doubled in each instance. The conditions under which the glycide was added were the same as in previous examples but required slightly longer for addition.

Example 10d

The same procedure was employed as in Examples 1d through 8d, preceding, except that where XAA1, XBB1 and XCC1 were employed, there were used instead the analogous compounds YAA1, YBB1, and YCC1, previously described.

Example 11d

The same procedure was employed as in Examples 1d through 8d, preceding, except that where XAA1, XBB1 and XCC1 were employed, there were used instead the analogous compounds ZAA1, ZBB1, and ZCC1, previously described.

It is to be noted that all the previous examples were prepared from a single resin only, to wit, a tertiary amylphenol formaldehyde resin. Needless to say, the same phenol could have been combined with acetylene and numerous other aldehydes described, or a different phenol could have been used. Under the circumstances it would have been impossible within a reasonable length of time to produce each and every compound herein included and specified as part of the invention. The reasons are obvious. However, we have prepared the equivalent of Example 1b, preceding, in respect to a spot check on a large number of resins and are showing them in the following table. In each instance the amount of glycide varied from 2% to 25% so as to cover the glycide range and the resins employed are indicated in the table. Some additional examples were also prepared, as follows:

ethylene oxide and propylene oxide is substantially the same as those obtained in which glycide is not used. There is no marked difference in physical appearance and glycides does, of course, add a greater proportion of water solubility. Needless to say, visual examination, or simple physical tests do not reveal the difference in structure pointed out above. These polyglycol ethers are comparatively thin liquids, sometimes showing only modest viscosity, and the color varies from almost water-white to pale amber. The color seems to be due to impurities and is a trace of iron getting into the compound during the process of manufacture, or may be present in the catalyst. The products, of course, show a considerable range of insolubility, from a stage where they are dispersible or miscible, to products which, at least in dilute solution, have an apparently homogeneous or transparent appearance.

Referring to Figure 3, it is apparent that although a number of examples have been included, and particular reference is made to Examples A through S, that there is a limit to the numbers which can be included without producing description which becomes burdensome in length. This applies to an even greater degree to the four-component system for the reason that one has included all points within the truncated tetrahedral pyramid depicted in Figure 4 and defined by E, F, G, H—I, J, K, L. However, for convenience, referring to the table which includes Examples A through I above, it is to be noted that the initial mixture includes 6 parts of resin, 3 parts of ethylene oxide, and one part of propylene oxide. This corresponds to point 1 on the chart. In the final example, to wit, Example I, corresponding to point 4 on the chart, there are employed 6 pounds of resin, one pound of ethylene oxide and 3 pounds of propylene oxide. All the significant 9 points in Figure 3, corresponding to Examples A to I, inclusive above, are shown in the following tables. The table shows the mixture with the three-component constituent (when recalculated back to 100% basis) and the corresponding figure when 2% to 25% glycide is present. The tables are self-explanatory and illustrate compositions which set the boundary or

| Percent Glycide | Amyl Formald. | Butyl Formald. | Octyl Formald. | Nonyl Formald. | Menthyl Formald. | Amylphenol Acetaldehyde Resin | Butyl Propion-Aldehyde Resin | Octyl Phenol Fufural Resin | Nonyl Phenol Heptaldehyde Resin | Menthyl Butyral Aldehyde Resin |
|---|---|---|---|---|---|---|---|---|---|---|
| 2 | | X | | | | | X | | | |
| 3 | | | X | | | | | X | | |
| 4 | | | | X | | | | | X | |
| 5 | | | | | X | | | | | X |
| 6 | X | | | | | X | | | | |
| 7 | | X | | | | | X | | | |
| 8 | | | X | | | | | X | | |
| 9 | | | | X | | | | | X | |
| 10 | | | | | X | | | | | X |
| 11 | X | | | | | X | | | | |
| 12 | | X | | | | | X | | | |
| 13 | | | X | | | | | X | | |
| 14 | | | | X | | | | | X | |
| 15 | | | | | X | | | | | X |
| 16 | X | | | | | X | | | | |
| 17 | | X | | | | | X | | | |
| 18 | | | X | | | | | X | | |
| 19 | | | | X | | | | | X | |
| 20 | | | | | X | | | | | X |
| 21 | X | | | | | X | | | | |
| 22 | | X | | | | | X | | | |
| 23 | | | X | | | | | X | | |
| 24 | | | | X | | | | | X | |
| 25 | | | | | X | | | | | X |

Incidentally, the physical appearance of the materials obtained using glycide in addition to limiting compositions. We have spot checked such compositions and prepared a substantial number but are not including them for the reason that such inclusion would be only repetitious over and above what has been said previously.

Table A

TABLE FOR EX. A SERIES—POINT 1 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 60 | 30 | 10 | 58.8 | 29.4 | 9.8 |
| 3 | 97 | 60 | 30 | 10 | 58.2 | 29.1 | 9.7 |
| 4 | 96 | 60 | 30 | 10 | 57.6 | 28.8 | 9.6 |
| 5 | 95 | 60 | 30 | 10 | 57.0 | 28.5 | 9.5 |
| 6 | 94 | 60 | 30 | 10 | 56.4 | 28.2 | 9.4 |
| 7 | 93 | 60 | 30 | 10 | 55.8 | 27.9 | 9.3 |
| 8 | 92 | 60 | 30 | 10 | 55.2 | 27.6 | 9.2 |
| 9 | 91 | 60 | 30 | 10 | 54.6 | 27.3 | 9.1 |
| 10 | 90 | 60 | 30 | 10 | 54.0 | 27.0 | 9.0 |
| 11 | 89 | 60 | 30 | 10 | 53.4 | 26.7 | 8.9 |
| 12 | 88 | 60 | 30 | 10 | 52.8 | 26.4 | 8.8 |
| 13 | 87 | 60 | 30 | 10 | 52.2 | 26.1 | 8.7 |
| 14 | 86 | 60 | 30 | 10 | 51.6 | 25.8 | 8.6 |
| 15 | 85 | 60 | 30 | 10 | 51.0 | 25.5 | 8.5 |
| 16 | 84 | 60 | 30 | 10 | 50.4 | 25.2 | 8.4 |
| 17 | 83 | 60 | 30 | 10 | 49.8 | 24.9 | 8.3 |
| 18 | 82 | 60 | 30 | 10 | 49.2 | 24.6 | 8.2 |
| 19 | 81 | 60 | 30 | 10 | 48.6 | 24.3 | 8.1 |
| 20 | 80 | 60 | 30 | 10 | 48.0 | 24.0 | 8.0 |
| 21 | 79 | 60 | 30 | 10 | 47.4 | 23.7 | 7.9 |
| 22 | 78 | 60 | 30 | 10 | 46.8 | 23.4 | 7.8 |
| 23 | 77 | 60 | 30 | 10 | 46.2 | 23.1 | 7.7 |
| 24 | 76 | 60 | 30 | 10 | 45.6 | 22.8 | 7.6 |
| 25 | 75 | 60 | 30 | 10 | 45.0 | 22.5 | 7.5 |

Table B

TABLE FOR EX. B SERIES—POINT 5 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 50 | 40 | 10 | 49.0 | 39.2 | 9.8 |
| 3 | 97 | 50 | 40 | 10 | 48.5 | 38.8 | 9.7 |
| 4 | 96 | 50 | 40 | 10 | 48.0 | 38.4 | 9.6 |
| 5 | 95 | 50 | 40 | 10 | 47.5 | 38.0 | 9.5 |
| 6 | 94 | 50 | 40 | 10 | 47.0 | 37.6 | 9.4 |
| 7 | 93 | 50 | 40 | 10 | 46.5 | 37.2 | 9.3 |
| 8 | 92 | 50 | 40 | 10 | 46.0 | 36.8 | 9.2 |
| 9 | 91 | 50 | 40 | 10 | 45.5 | 36.4 | 9.1 |
| 10 | 90 | 50 | 40 | 10 | 45.0 | 36.0 | 9.0 |
| 11 | 89 | 50 | 40 | 10 | 44.5 | 35.6 | 8.9 |
| 12 | 88 | 50 | 40 | 10 | 44.0 | 35.2 | 8.8 |
| 13 | 87 | 50 | 40 | 10 | 43.5 | 34.8 | 8.7 |
| 14 | 86 | 50 | 40 | 10 | 43.0 | 34.4 | 8.6 |
| 15 | 85 | 50 | 40 | 10 | 42.5 | 34.0 | 8.5 |
| 16 | 84 | 50 | 40 | 10 | 42.0 | 33.6 | 8.4 |
| 17 | 83 | 50 | 40 | 10 | 41.5 | 33.2 | 8.3 |
| 18 | 82 | 50 | 40 | 10 | 41.0 | 32.8 | 8.2 |
| 19 | 81 | 50 | 40 | 10 | 40.5 | 32.4 | 8.1 |
| 20 | 80 | 50 | 40 | 10 | 40.0 | 32.0 | 8.0 |
| 21 | 79 | 50 | 40 | 10 | 39.5 | 31.6 | 7.9 |
| 22 | 78 | 50 | 40 | 10 | 39.0 | 31.2 | 7.8 |
| 23 | 77 | 50 | 40 | 10 | 38.5 | 30.8 | 7.7 |
| 24 | 76 | 50 | 40 | 10 | 38.0 | 30.4 | 7.6 |
| 25 | 75 | 50 | 40 | 10 | 37.5 | 30.0 | 7.5 |

Table C

TABLE FOR EX. C SERIES—POINT 8 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 30 | 60 | 10 | 29.4 | 58.8 | 9.8 |
| 3 | 97 | 30 | 60 | 10 | 29.1 | 58.2 | 9.7 |
| 4 | 96 | 30 | 60 | 10 | 28.8 | 57.6 | 9.6 |
| 5 | 95 | 30 | 60 | 10 | 28.5 | 57.0 | 9.5 |
| 6 | 94 | 30 | 60 | 10 | 28.2 | 56.4 | 9.4 |
| 7 | 93 | 30 | 60 | 10 | 27.9 | 55.8 | 9.3 |
| 8 | 92 | 30 | 60 | 10 | 27.6 | 55.2 | 9.2 |
| 9 | 91 | 30 | 60 | 10 | 27.3 | 54.6 | 9.1 |
| 10 | 90 | 30 | 60 | 10 | 27.0 | 54.0 | 9.0 |
| 11 | 89 | 30 | 60 | 10 | 26.7 | 53.4 | 8.9 |
| 12 | 88 | 30 | 60 | 10 | 26.4 | 52.8 | 8.8 |
| 13 | 87 | 30 | 60 | 10 | 26.1 | 52.2 | 8.7 |
| 14 | 86 | 30 | 60 | 10 | 25.8 | 51.6 | 8.6 |
| 15 | 85 | 30 | 60 | 10 | 25.5 | 51.0 | 8.5 |
| 16 | 84 | 30 | 60 | 10 | 25.2 | 50.4 | 8.4 |
| 17 | 83 | 30 | 60 | 10 | 24.9 | 49.8 | 8.3 |
| 18 | 82 | 30 | 60 | 10 | 24.6 | 49.2 | 8.2 |
| 19 | 81 | 30 | 60 | 10 | 24.3 | 48.6 | 8.1 |
| 20 | 80 | 30 | 60 | 10 | 24.0 | 48.0 | 8.0 |
| 21 | 79 | 30 | 60 | 10 | 23.7 | 47.4 | 7.9 |
| 22 | 78 | 30 | 60 | 10 | 23.4 | 46.8 | 7.8 |
| 23 | 77 | 30 | 60 | 10 | 23.1 | 46.2 | 7.7 |
| 24 | 76 | 30 | 60 | 10 | 22.8 | 45.6 | 7.6 |
| 25 | 75 | 30 | 60 | 10 | 22.5 | 45.0 | 7.5 |

Table D

TABLE FOR EX. D SERIES—POINT 2 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 4 | 86 | 10 | 3.9 | 84.3 | 9.8 |
| 3 | 97 | 4 | 86 | 10 | 3.9 | 83.4 | 9.7 |
| 4 | 96 | 4 | 86 | 10 | 3.8 | 82.6 | 9.6 |
| 5 | 95 | 4 | 86 | 10 | 3.8 | 81.7 | 9.5 |
| 6 | 94 | 4 | 86 | 10 | 3.8 | 80.8 | 9.4 |
| 7 | 93 | 4 | 86 | 10 | 3.7 | 80.0 | 9.3 |
| 8 | 92 | 4 | 86 | 10 | 3.7 | 79.1 | 9.2 |
| 9 | 91 | 4 | 86 | 10 | 3.6 | 78.3 | 9.1 |
| 10 | 90 | 4 | 86 | 10 | 3.6 | 77.4 | 9.0 |
| 11 | 89 | 4 | 86 | 10 | 3.6 | 76.5 | 8.9 |
| 12 | 88 | 4 | 86 | 10 | 3.5 | 75.7 | 8.8 |
| 13 | 87 | 4 | 86 | 10 | 3.5 | 74.8 | 8.7 |
| 14 | 86 | 4 | 86 | 10 | 3.4 | 74.0 | 8.6 |
| 15 | 85 | 4 | 86 | 10 | 3.4 | 73.1 | 8.5 |
| 16 | 84 | 4 | 86 | 10 | 3.4 | 72.2 | 8.4 |
| 17 | 83 | 4 | 86 | 10 | 3.3 | 71.4 | 8.3 |
| 18 | 82 | 4 | 86 | 10 | 3.3 | 70.5 | 8.2 |
| 19 | 81 | 4 | 86 | 10 | 3.2 | 69.7 | 8.1 |
| 20 | 80 | 4 | 86 | 10 | 3.2 | 68.8 | 8.0 |
| 21 | 79 | 4 | 86 | 10 | 3.2 | 67.9 | 7.9 |
| 22 | 78 | 4 | 86 | 10 | 3.1 | 67.1 | 7.8 |
| 23 | 77 | 4 | 86 | 10 | 3.1 | 66.2 | 7.7 |
| 24 | 76 | 4 | 86 | 10 | 3.0 | 65.4 | 7.6 |
| 25 | 75 | 4 | 86 | 10 | 3.0 | 64.5 | 7.5 |

Table E

TABLE FOR EX. E SERIES—POINT 9 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 4 | 60 | 36 | 3.9 | 58.8 | 35.3 |
| 3 | 97 | 4 | 60 | 36 | 3.9 | 58.2 | 34.9 |
| 4 | 96 | 4 | 60 | 36 | 3.8 | 57.6 | 34.6 |
| 5 | 95 | 4 | 60 | 36 | 3.8 | 57.0 | 34.2 |
| 6 | 94 | 4 | 60 | 36 | 3.8 | 56.4 | 33.8 |
| 7 | 93 | 4 | 60 | 36 | 3.7 | 55.8 | 33.5 |
| 8 | 92 | 4 | 60 | 36 | 3.7 | 55.2 | 33.1 |
| 9 | 91 | 4 | 60 | 36 | 3.6 | 54.6 | 32.8 |
| 10 | 90 | 4 | 60 | 36 | 3.6 | 54.0 | 32.4 |
| 11 | 89 | 4 | 60 | 36 | 3.6 | 53.4 | 32.0 |
| 12 | 88 | 4 | 60 | 36 | 3.5 | 52.8 | 31.7 |
| 13 | 87 | 4 | 60 | 36 | 3.5 | 52.2 | 31.3 |
| 14 | 86 | 4 | 60 | 36 | 3.4 | 51.6 | 31.0 |
| 15 | 85 | 4 | 60 | 36 | 3.4 | 51.0 | 30.6 |
| 16 | 84 | 4 | 60 | 36 | 3.4 | 50.4 | 30.2 |
| 17 | 83 | 4 | 60 | 36 | 3.3 | 49.8 | 29.9 |
| 18 | 82 | 4 | 60 | 36 | 3.3 | 49.2 | 29.5 |
| 19 | 81 | 4 | 60 | 36 | 3.2 | 48.6 | 29.2 |
| 20 | 80 | 4 | 60 | 36 | 3.2 | 48.0 | 28.8 |
| 21 | 79 | 4 | 60 | 36 | 3.2 | 47.4 | 28.4 |
| 22 | 78 | 4 | 60 | 36 | 3.1 | 46.8 | 28.1 |
| 23 | 77 | 4 | 60 | 36 | 3.1 | 46.2 | 27.7 |
| 24 | 76 | 4 | 60 | 36 | 3.0 | 45.6 | 27.4 |
| 25 | 75 | 4 | 60 | 36 | 3.0 | 45.0 | 27.0 |

Table F

TABLE FOR EX. F SERIES—POINT 6 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 4 | 40 | 56 | 3.9 | 39.2 | 54.9 |
| 3 | 97 | 4 | 40 | 56 | 3.9 | 38.8 | 54.3 |
| 4 | 96 | 4 | 40 | 56 | 3.8 | 38.4 | 53.8 |
| 5 | 95 | 4 | 40 | 56 | 3.8 | 38.0 | 53.2 |
| 6 | 94 | 4 | 40 | 56 | 3.8 | 37.6 | 52.6 |
| 7 | 93 | 4 | 40 | 56 | 3.7 | 37.2 | 52.1 |
| 8 | 92 | 4 | 40 | 56 | 3.7 | 36.8 | 51.5 |
| 9 | 91 | 4 | 40 | 56 | 3.6 | 36.4 | 51.0 |
| 10 | 90 | 4 | 40 | 56 | 3.6 | 36.0 | 50.4 |
| 11 | 89 | 4 | 40 | 56 | 3.6 | 35.6 | 49.8 |
| 12 | 88 | 4 | 40 | 56 | 3.5 | 35.2 | 49.3 |
| 13 | 87 | 4 | 40 | 56 | 3.5 | 34.8 | 48.7 |
| 14 | 86 | 4 | 40 | 56 | 3.4 | 34.4 | 48.2 |
| 15 | 85 | 4 | 40 | 56 | 3.4 | 34.0 | 47.6 |
| 16 | 84 | 4 | 40 | 56 | 3.4 | 33.6 | 47.0 |
| 17 | 83 | 4 | 40 | 56 | 3.3 | 33.2 | 46.5 |
| 18 | 82 | 4 | 40 | 56 | 3.3 | 32.8 | 45.9 |
| 19 | 81 | 4 | 40 | 56 | 3.2 | 32.4 | 45.4 |
| 20 | 80 | 4 | 40 | 56 | 3.2 | 32.0 | 44.8 |
| 21 | 79 | 4 | 40 | 56 | 3.2 | 31.6 | 44.2 |
| 22 | 78 | 4 | 40 | 56 | 3.1 | 31.2 | 43.7 |
| 23 | 77 | 4 | 40 | 56 | 3.1 | 30.8 | 43.1 |
| 24 | 76 | 4 | 40 | 56 | 3.0 | 30.4 | 42.6 |
| 25 | 75 | 4 | 40 | 56 | 3.0 | 30.0 | 42.0 |

Table G

TABLE FOR EX. G SERIES—POINT 3 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 4 | 10 | 86 | 3.9 | 9.8 | 84.3 |
| 3 | 97 | 4 | 10 | 86 | 3.9 | 9.7 | 83.4 |
| 4 | 96 | 4 | 10 | 86 | 3.8 | 9.6 | 82.6 |
| 5 | 95 | 4 | 10 | 86 | 3.8 | 9.5 | 81.7 |
| 6 | 94 | 4 | 10 | 86 | 3.8 | 9.4 | 80.8 |
| 7 | 93 | 4 | 10 | 86 | 3.7 | 9.3 | 80.0 |
| 8 | 92 | 4 | 10 | 86 | 3.7 | 9.2 | 79.1 |
| 9 | 91 | 4 | 10 | 86 | 3.6 | 9.1 | 78.3 |
| 10 | 90 | 4 | 10 | 86 | 3.6 | 9.0 | 77.4 |
| 11 | 89 | 4 | 10 | 86 | 3.6 | 8.9 | 76.5 |
| 12 | 88 | 4 | 10 | 86 | 3.5 | 8.8 | 75.7 |
| 13 | 87 | 4 | 10 | 86 | 3.5 | 8.7 | 74.8 |
| 14 | 86 | 4 | 10 | 86 | 3.4 | 8.6 | 74.0 |
| 15 | 85 | 4 | 10 | 86 | 3.4 | 8.5 | 73.1 |
| 16 | 84 | 4 | 10 | 86 | 3.4 | 8.4 | 72.2 |
| 17 | 83 | 4 | 10 | 86 | 3.3 | 8.3 | 71.4 |
| 18 | 82 | 4 | 10 | 86 | 3.3 | 8.2 | 70.5 |
| 19 | 81 | 4 | 10 | 86 | 3.2 | 8.1 | 69.7 |
| 20 | 80 | 4 | 10 | 86 | 3.2 | 8.0 | 68.8 |
| 21 | 79 | 4 | 10 | 86 | 3.2 | 7.9 | 67.9 |
| 22 | 78 | 4 | 10 | 86 | 3.1 | 7.8 | 67.1 |
| 23 | 77 | 4 | 10 | 86 | 3.1 | 7.7 | 66.2 |
| 24 | 76 | 4 | 10 | 86 | 3.0 | 7.6 | 65.4 |
| 25 | 75 | 4 | 10 | 86 | 3.0 | 7.5 | 64.5 |

Table H

TABLE FOR EX. H SERIES—POINT 7 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 50 | 10 | 40 | 49.0 | 9.8 | 39.2 |
| 3 | 97 | 50 | 10 | 40 | 48.5 | 9.7 | 39.8 |
| 4 | 96 | 50 | 10 | 40 | 48.0 | 9.6 | 38.4 |
| 5 | 95 | 50 | 10 | 40 | 47.5 | 9.5 | 38.0 |
| 6 | 94 | 50 | 10 | 40 | 47.0 | 9.4 | 37.6 |
| 7 | 93 | 50 | 10 | 40 | 46.5 | 9.3 | 37.2 |
| 8 | 92 | 50 | 10 | 40 | 46.0 | 9.2 | 36.8 |
| 9 | 91 | 50 | 10 | 40 | 45.5 | 9.1 | 36.4 |
| 10 | 90 | 50 | 10 | 40 | 45.0 | 9.0 | 36.0 |
| 11 | 89 | 50 | 10 | 40 | 44.5 | 8.9 | 35.6 |
| 12 | 88 | 50 | 10 | 40 | 44.0 | 8.8 | 35.2 |
| 13 | 87 | 50 | 10 | 40 | 43.5 | 8.7 | 34.8 |
| 14 | 86 | 50 | 10 | 40 | 43.0 | 8.6 | 34.4 |
| 15 | 85 | 50 | 10 | 40 | 42.5 | 8.5 | 34.0 |
| 16 | 84 | 50 | 10 | 40 | 42.0 | 8.4 | 33.6 |
| 17 | 83 | 50 | 10 | 40 | 41.5 | 8.3 | 33.2 |
| 18 | 82 | 50 | 10 | 40 | 41.0 | 8.2 | 32.8 |
| 19 | 81 | 50 | 10 | 40 | 40.5 | 8.1 | 32.4 |
| 20 | 80 | 50 | 10 | 40 | 40.0 | 8.0 | 32.0 |
| 21 | 79 | 50 | 10 | 40 | 39.5 | 7.9 | 31.6 |
| 22 | 78 | 50 | 10 | 40 | 39.0 | 7.8 | 31.2 |
| 23 | 77 | 50 | 10 | 40 | 38.5 | 7.7 | 30.8 |
| 24 | 76 | 50 | 10 | 40 | 38.0 | 7.6 | 30.4 |
| 25 | 75 | 50 | 10 | 40 | 37.5 | 7.5 | 30.0 |

Table I

TABLE FOR EX. I SERIES—POINT 4 ON TRIANGULAR GRAPH (Figure 3)

| Per cent Glycid | Per cent Remaining 3 Reactants | Per cent Remaining 3 Reactants Based on Triangular Graph | | | Per cent Remaining 3 Reactants Calculated Back to Allow for Per cent Glycid | | |
|---|---|---|---|---|---|---|---|
| | | Resin | EtO | PrO | Resin | EtO | PrO |
| 2 | 98 | 60 | 10 | 30 | 58.8 | 9.8 | 29.4 |
| 3 | 97 | 60 | 10 | 30 | 58.2 | 9.7 | 29.1 |
| 4 | 96 | 60 | 10 | 30 | 57.6 | 9.6 | 28.8 |
| 5 | 95 | 60 | 10 | 30 | 57.0 | 9.5 | 28.5 |
| 6 | 94 | 60 | 10 | 30 | 56.4 | 9.4 | 28.2 |
| 7 | 93 | 60 | 10 | 30 | 55.8 | 9.3 | 29.9 |
| 8 | 92 | 60 | 10 | 30 | 55.2 | 9.2 | 27.6 |
| 9 | 91 | 60 | 10 | 30 | 54.6 | 9.1 | 27.3 |
| 10 | 90 | 60 | 10 | 30 | 54.0 | 9.0 | 27.0 |
| 11 | 89 | 60 | 10 | 30 | 53.4 | 8.9 | 26.7 |
| 12 | 88 | 60 | 10 | 30 | 52.8 | 8.8 | 26.4 |
| 13 | 87 | 60 | 10 | 30 | 52.2 | 8.7 | 26.1 |
| 14 | 86 | 60 | 10 | 30 | 51.6 | 8.6 | 25.8 |
| 15 | 85 | 60 | 10 | 30 | 51.0 | 8.5 | 25.5 |
| 16 | 84 | 60 | 10 | 30 | 50.4 | 8.4 | 25.2 |
| 17 | 83 | 60 | 10 | 30 | 49.8 | 8.3 | 24.9 |
| 18 | 82 | 60 | 10 | 30 | 49.2 | 8.2 | 24.6 |
| 19 | 81 | 60 | 10 | 30 | 48.6 | 8.1 | 24.3 |
| 20 | 80 | 60 | 10 | 30 | 48.0 | 8.0 | 24.0 |
| 21 | 79 | 60 | 10 | 30 | 47.4 | 7.9 | 23.7 |
| 22 | 78 | 60 | 10 | 30 | 46.8 | 7.8 | 23.4 |
| 23 | 77 | 60 | 10 | 30 | 46.2 | 7.7 | 23.1 |
| 24 | 76 | 60 | 10 | 30 | 45.6 | 7.6 | 22.8 |
| 25 | 75 | 60 | 10 | 30 | 45.0 | 7.5 | 22.5 |

Having thus described our invention, what we claim as new and desire to secure by Letters Patent, is

1. A cogeneric mixture of a homologous series of glycol ethers of phenol-acetylene resins; said cogeneric mixture being derived exclusively from oxyalkylation-susceptible, fusible, organic solvent-soluble, water-insoluble, phenol-acetylene resins in which at least part of the radicals linking the phenolic nuclei are divalent radicals resulting from the reaction of an acetylenic hydrocarbon with a phenolic structure, glycide, ethylene oxide and propylene oxide in such weight proportions so the average compositions of said cogeneric mixture stated in terms of initial reactants lies within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately within the trapezoidal area defined in Figure 3 by points 1, 2, 3 and 4; said resin being derived at least in part by reaction of a phenol with an acetylenic hydrocarbon so as to introduce an alternate acetylenic radical as the linking structure between phenolic nuclei with any remaining linkages between phenolic nuclei being divalent radicals resulting from phenol-aldehyde condensation and having not more than 8 carbon atoms.

2. A cogeneric mixture of a homologous series of glycol ethers of phenol-acetylene resins; said cogeneric mixture being derived exclusively from oxyalkylation-susceptible, fusible, organic solvent-soluble, water-insoluble, phenol-acetylene resins in which at least part of the radicals linking the phenolic nuclei are divalent radicals resulting from the reaction of an acetylenic hydrocarbon with a phenolic structure, glycide, ethylene oxide and propylene oxide in such weight proportions so the average composition of said cogeneric mixture stated in terms of initial reactants lies within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie within the parallelogram defined in Figure 3 by points 5, 6, 3 and 7; said resin being derived at least in part by reaction of a phenol with an acetylenic hydrocarbon so as to introduce an alternate acetylenic radical as the linking structure between phenolic nuclei with any remaining linkages between phenolic nuclei being divalent radicals resulting from phenol-aldehyde condensation and having not more than 8 carbon atoms.

3. A non-detersive cogeneric mixture of a homologous series of glycol ethers of phenol-acetylene resins; said non-detersive cogeneric mixture being derived exclusively from oxyalkylation-susceptible, fusible, organic solvent-soluble, water-insoluble phenol-acetylene resins in which the radicals linking the phenolic nuclei are divalent radicals resulting from the reaction of acetylene with a phenol, glycide, ethylene oxide and propylene oxide in such weight proportions so the average composition of said cogeneric mixture stated in terms of initial reactants lies within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie within the parallelogram defined in Figure 3 by points 5, 6, 3 and 7; said resin being derived at least in part by reaction of a phenol with acetylene so as to introduce an alternate acetylene radical as the linking structure between phenolic nuclei with any remaining linkages between phenolic nuclei being divalent radicals resulting from phenol-aldehyde condensation and having not more than 8 carbon atoms; and with the proviso that the hydrophile properties of said oxyalkylated resin in an equal weight of xylene are sufficient to produce an emulsion when said xylene solution is shaken vigorously with one to three volumes of water.

4. The product of claim 3 wherein the resin is obtained from acetylene and a phenol in absence of an aldehyde.

5. The product of claim 3 wherein the resin is an acetylene-treated phenol-aldehyde resin.

6. The product of claim 3 wherein the resin is an aldehyde-after-treated phenol-acetylene resin.

MELVIN DE GROOTE.
BERNHARD KEISER.

REFERENCES CITED

The following references are of record in the file of this patent:

UNITED STATES PATENTS

| Number | Name | Date |
|---|---|---|
| 2,040,212 | Orthner | May 12, 1936 |
| 2,076,624 | De Groote | Apr. 13, 1937 |
| 2,501,015 | Wirtel | Mar. 21, 1950 |